United States Patent
Hucker et al.

(10) Patent No.: US 9,819,032 B2
(45) Date of Patent: Nov. 14, 2017

(54) STANDBY ELECTRICAL ENERGY STORAGE DEVICES

(71) Applicant: BAE SYSTEMS PLC, London (GB)

(72) Inventors: Martyn John Hucker, Bristol (GB); Sajad Haq, Bristol (GB); Michael Dunleavy, Bristol (GB)

(73) Assignee: BAE SYSTEMS PLC, London (GB)

( * ) Notice: Subject to any disclaimer, the term of this patent is extended or adjusted under 35 U.S.C. 154(b) by 50 days.

(21) Appl. No.: 14/772,249

(22) PCT Filed: Feb. 26, 2014

(86) PCT No.: PCT/GB2014/050571
§ 371 (c)(1),
(2) Date: Sep. 2, 2015

(87) PCT Pub. No.: WO2014/135846
PCT Pub. Date: Sep. 12, 2014

(65) Prior Publication Data
US 2016/0006043 A1    Jan. 7, 2016

(30) Foreign Application Priority Data

Mar. 4, 2013 (EP) ..................... 13275046
Mar. 4, 2013 (GB) ..................... 1303766.8

(51) Int. Cl.
*H01M 6/32* (2006.01)
*H01M 2/16* (2006.01)
(Continued)

(52) U.S. Cl.
CPC ............ *H01M 6/32* (2013.01); *H01G 11/04* (2013.01); *H01G 11/18* (2013.01); *H01G 11/56* (2013.01);
(Continued)

(58) Field of Classification Search
CPC .... H01M 6/32; H01M 2/1613; H01M 2/1666; H01M 2/18; H01M 4/12; H01M 4/244;
(Continued)

(56) References Cited

U.S. PATENT DOCUMENTS 3,343,994 A   9/1967  Stanimirovitch
4,061,842 A   12/1977 Evans
(Continued)

FOREIGN PATENT DOCUMENTS

| EP | 1278261 A1 | 1/2003 | |
| GB | WO 2011098793 A1 * | 8/2011 | .......... H01M 2/1606 |
| WO | 03058736 A1 | 7/2003 | |

OTHER PUBLICATIONS

EP Search Report dated Sep. 4, 2013 of Patent Application No. EP13275046.4 filed Mar. 4, 2013.
(Continued)

*Primary Examiner* — Gregg Cantelmo
(74) *Attorney, Agent, or Firm* — Maine Cernota & Rardin

(57) ABSTRACT

This invention relates to the formation of standby structural composite electrical energy storage devices, and a method of producing same. The device may be a standby battery or supercapacitor with first and second electrodes which are separated by a separator structure, wherein the device contains an electrolyte retained in a reservoir. The use of at least one valve allows the addition, removal of electrolyte fluids, and venting of any outgassing by products.

11 Claims, 1 Drawing Sheet

(51) Int. Cl.
*H01M 2/18* (2006.01)
*H01M 4/12* (2006.01)
*H01M 4/24* (2006.01)
*H01M 4/34* (2006.01)
*H01M 4/36* (2006.01)
*H01G 11/04* (2013.01)
*H01G 11/18* (2013.01)
*H01G 11/56* (2013.01)
*H01G 11/62* (2013.01)
*H01G 11/78* (2013.01)

(52) U.S. Cl.
CPC .............. *H01G 11/62* (2013.01); *H01G 11/78* (2013.01); *H01M 2/1613* (2013.01); *H01M 2/1666* (2013.01); *H01M 2/18* (2013.01); *H01M 4/12* (2013.01); *H01M 4/244* (2013.01); *H01M 4/34* (2013.01); *H01M 4/364* (2013.01); *H01M 2220/20* (2013.01); *Y02E 60/13* (2013.01)

(58) Field of Classification Search
CPC .... H01M 4/34; H01M 4/364; H01M 2220/20; H01G 11/04; H01G 11/18; H01G 11/56; H01G 11/62; H01G 11/78
See application file for complete search history.

(56) References Cited

U.S. PATENT DOCUMENTS

| | | |
|---|---|---|
| 4,150,198 A | 4/1979 | Domeniconi et al. |
| 4,198,474 A | 4/1980 | Shah |
| 4,446,211 A | 5/1984 | Goebel et al. |
| 6,844,108 B1* | 1/2005 | Lee .......... H01M 6/38 429/110 |
| 2004/0224195 A1 | 11/2004 | Huang |
| 2008/0254341 A1* | 10/2008 | Bailey ............ H01M 8/04089 429/407 |
| 2012/0175998 A1* | 7/2012 | Chiang ................ F03G 7/005 310/300 |

OTHER PUBLICATIONS

GB Search Report dated Sep. 4, 2013 of Patent Application No. GB1303766.8 filed Mar. 4, 2013.

PCT Search Report dated Jun. 12, 2014 of Patent Application No. PCT/GB2014/050571 filed Feb. 26, 2014.

* cited by examiner

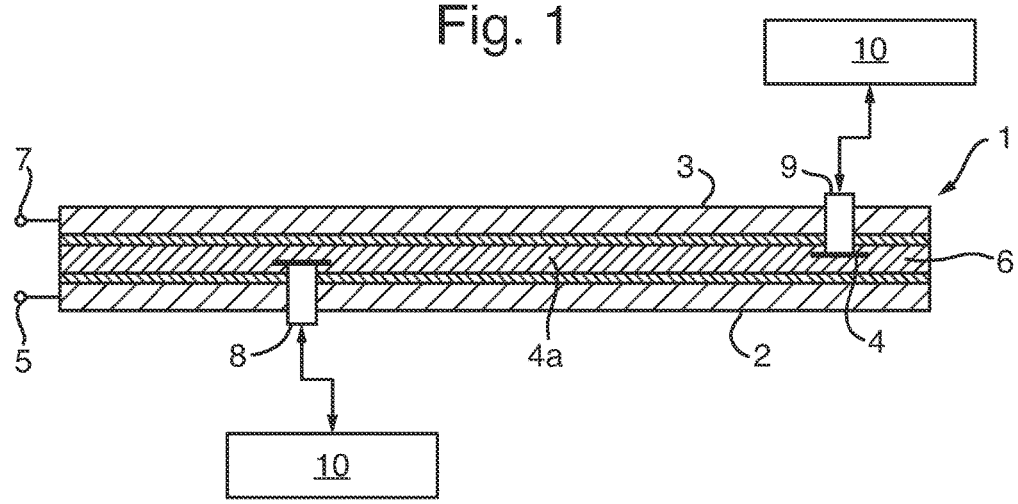
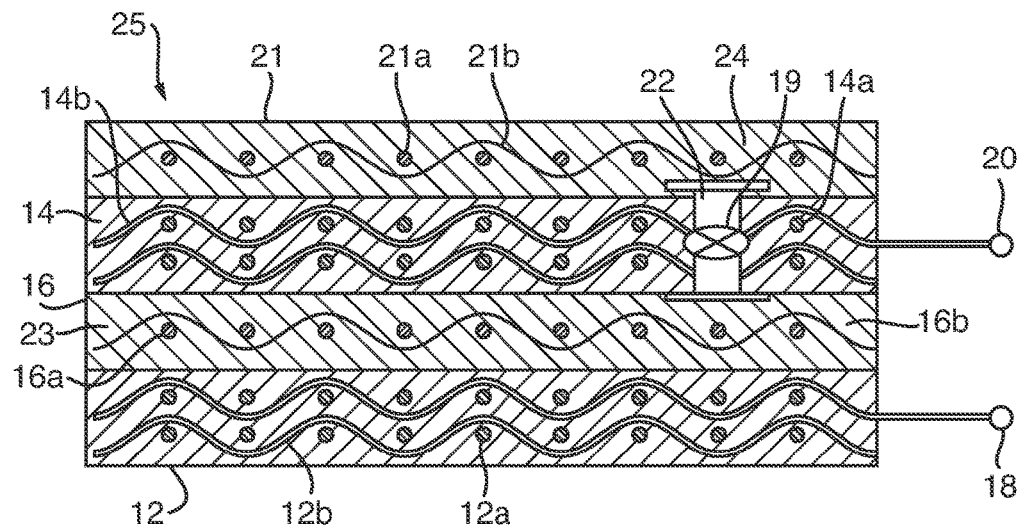

STANDBY ELECTRICAL ENERGY STORAGE DEVICES

RELATED APPLICATIONS

This application is a national phase application filed under 35 USC §371 of PCT Application No. PCT/GB2014/050571 with an International filing date of Feb. 26, 2014 which claims priority of GB Patent Application 1303766.8 filed Mar. 4, 2013 and EP Patent Application 13275046.4 filed Mar. 4, 2013. Each of these applications is herein incorporated by reference in its entirety for all purposes.

FIELD OF THE INVENTION

The invention relates to the formation of standby structural composite electrical energy storage devices.

BACKGROUND OF THE INVENTION

Rechargeable cells suffer from self-discharge so must be topped up by periodic charging. Rechargeable cells also have finite charge/discharge lifetimes and can suffer from long term chemical degradation even when not used. This can present reliability issues and so they are not suitable for applications where the power supply must be guaranteed to be available on demand and/or at very short notice.

Primary (non-rechargeable) cells can be configured so that they are inert until required for use then activated to provide power. No chemical reactions are taking place when the cells are in the standby state so shelf life and in-service times can be very long (10s of years).

One example of a standby cell is the thermal battery (as used in ejection seats). In these devices the electrolyte is solid in the standby state and the battery is activated when the electrolyte is melted by a pyrotechnic device.

A further example of a standby cell is a salt water activated battery as used for submarine weapons such as torpedoes. The electrolyte is not present in the standby state and the battery is activated by introduction of a suitable fluid. The electrolyte can be stored externally and activation is achieved by injection into the cell or alternatively the electrolyte, or critical parts of it, can be supplied from an external source.

SUMMARY OF THE INVENTION

According to a first aspect of the invention there is provided a standby structural composite electrical energy storage device comprising
a first electrode structure,
a second electrode structure,
a separator structure, said structures being encapsulated in a binder matrix to form a composite, wherein the separator structure separates the first and second electrode structures respectively, wherein said device comprises at least one void between said first and second electrode structures, said void capable of being filled with an electrolyte,
at least one reservoir, comprising an electrolyte, wherein said reservoir is operably linked, by a valve, to said at least one void, such that operation of said valve allows the void to be charged with the electrolyte.

The separator structure which separates the first and second electrodes respectively prevents electrical short circuits whilst permitting the free passage of ions. The void may be any opening, cavity, created within the layers of the device. The void may be the pores within a porous material or structural lattice, or a void created within the cured device by use of a partially bonded separator layer or a sacrificial template that is removed after curing, preferably a partially bonded separator layer.

The valve allows the void to be charged/discharged with a fluidic electrolyte, such that the process of filling and draining the void thus creates an active cell, which may be achieved as and when activated either passively or actively. It may be desirable to discharge the device such as, for example during transportation, routine servicing, or after the activation of the battery and subsequent recovery of a system comprising the standby battery. After the device has served its function, the electrolyte may be evacuated from the at least one void. The electrolyte may simply be discarded or may be returned to the reservoir to provide the feature of a standby battery. The device may effectively be deactivated or at least have its energy storage capacity significantly reduced compared to when the electrolyte is present, by removal of the electrolyte. Therefore the drained device may have a reduced hazard or lower risk and hence may be easier to handle, store or transport.

The device may comprise at least two valves, such that the void may be filled under positive or negative pressure. During a positive pressure fill procedure the air in the void may be readily displaced by the fluid entering the void, via a first valve, such that the displaced air may readily leave via a second valve, the second valve may simply be a vent to atmosphere. Alternatively the device may be filled under vacuum, by applying a vacuum at one valve and introducing the electrolyte from the reservoir via the second valve. The fill procedure may simply be performed by using positive or negative pressure gradients already set up within the at least one void or reservoir. Further the electrolyte may enter via capillary action or under the action of gravity. The device may optionally contain a transfer device, such as a pump or piston to expedite or assist in the transfer of the electrolyte to and optionally from the at least one void.

Where the device has a large surface area, it may be advantageous to have at least two valves, or a plurality of valves to aid charging/discharging of the void in a timely manner. The at least two valves may be located on different parts of the at least one void to reduce the occurrence of air pockets.

The valve may be selected from any suitable valve such as, for example mechanical, chemical, electromechanical or thermal. In one embodiment the valve may be a plug of material which melts upon heating or upon contact with the electrolyte.

The valve may be mechanical, such that interaction from an external stimuli or force causes the valve to open, this may be the movement of a barrier or regulator to allow the electrolyte to be transferred into the at least one void. The mechanical valve may comprise a MEMS actuator to provide a movable barrier. The valve may be located external to the structure or form an integral part of the composite standby storage device, preferably the valve is integral with the fibre ply reinforcement.

In a highly preferred option the device comprises a vent system, such as a gas permeable membrane or valve. The vent system may form one of the at least two valves, so as to permit ready flow of fluids to charge and/or discharge the at least one void, as well as allow outgassing of any by-products or pressure build ups due to the expansion of the electrolyte during the operation of the cell.

Alternatively the vent system may be a removable vent system which can be applied after filling the at least one void with the electrolyte, and/or removed before evacuating the electrolyte from the device, such that the vent system may be simplified, and does not hinder filling or emptying the at least one void.

The energy storage device may be any structural composite electrical energy storage device, such as for example a composite battery or a composite supercapacitor.

The reservoir may be any receptacle suitable for storing, housing or collecting an electrolyte, such that at the required time the electrolyte may be caused to transfer, via the valve, to the at least one void. There may be a plurality of reservoirs. The reservoir may be a receptacle capable of collecting an electrolyte or a pre-electrolyte from the environment, such as, for example salt water or water, respectively. The reservoir may further comprise electrolytic compounds which could be added to a pre-electrolyte, such as for example water to allow it to function as a higher capacity electrolyte. It may be advantageous to collect the electrolyte upon the required activation of the standby cell to avoid carrying parasitic mass. In one such example the electrolyte may also be means for activating the standby cell, such as for example salt water for salt water battery chemistries. The salt water may cause the valve to function, by dissolving a plug of a water soluble material, which then allows the salt water to fill the at least one void.

In certain environments, such as, for example high altitudes or space, the standby device may require the electrolyte to be present in an integral reservoir such that the electrolyte may be readily supplied. The integral reservoir may be a further at least one void in an adjacent layer within the composite, such that upon activation of the valve the electrolyte may be caused to transfer between adjacent layers. The reservoir and at least one void may be located in the same layer, separator layer, especially within composite with a large surface area. The separator layer may be compartmentalised to have reservoir and the at least one void, with the required associated electrochemical cell layers. Activation may simply be afforded by breaking a membrane barrier, which acts as valve between the abutting co-planner reservoir and at least one void.

The electrolyte in the reservoir may be solid, liquid, gel or gaseous, provided that when caused to transfer to the at least one void it is fluidic, and is capable of sustaining ion transport.

Preferably, the separator structure is formed from a composite material which includes electrically insulating fibres in a binder matrix. The insulating fibres must also be resistant to the particular chemistry of the cell. Examples of suitable electrically insulating fibres include E-glass, S2-glass, silica, UHMWPE, aram ids, polypropylene, PTFE and silicon carbide.

The separator structure may include separator materials such as microporous polymer films, which may be used instead of or in combination with electrically insulating fibres in a binder matrix to aid ion transport.

The thickness of the first and second electrode structures and/or the separator structure may be conveniently varied in order to provide desired mechanical and electrical properties. These structures may be formed from one or more layers. Variation of the number of layers is one way in which the thickness of these structures may be varied.

According to a further aspect of the invention there is provided a panel on a vehicle vessel or craft comprising at least one device according to the invention.

A structural energy storage device is one which can be used in place of an existing panel or element, which forms part of a body, such as a replacement panel on a vehicle vessel or craft. A conventional disposable cell, whether in a vehicle or aircraft is exclusively an energy storage device. The devices as defined herein provide both structural support (in the same fashion as the vehicles original manufactures panel) and provide energy storage.

One advantage of transporting an electrical energy storage device in a discharged state, i.e. drained of electrolyte being present in the device, is that the device is substantially inactive, during any processing steps, transport or storage This not only reduces their mass for transport (so reducing costs) but increases safety as less active chemicals are present and the devices themselves are electrically inert. In the event of an accident during transport there would be less risk from chemical spills and no possibility of fire due to short circuits.

A particular application of structural electrical energy devices is seen as providing both structure and power in electrically powered vehicles, vessels or crafts, and where a source of power which does not add significantly to the weight of the system or occupy significant volume will enable the system to remain operational for longer than if conventional batteries were used or provide other performance enhancements such as higher speeds, increased manoeuvrability or increased payload capacity for example. Batteries used in this way will work well with solar cells, positioned say on the aircraft wings, which can be used to re-charge the cells in flight. Devices according to the invention may be used for example as wing skins and can be used to provide power for on board electrical systems, especially for back up or failure systems, where the primary cells have failed.

An energy storage device according to the invention may conveniently be made by any known manufacturing processes compatible with the cell chemistry concerned. One advantage of using these commonly used techniques is that devices of the invention may be employed to replace already existing parts made by the same techniques but not having the advantage of an energy storage device formed integral therewith.

Devices according to the invention may be used in new designs or to replace worn, damaged or outdated parts of any items which can be manufactured of a metallic material. For example, vehicles, whether land, air, space or water born, may have parts manufactured with integral cells, according to the invention. Examples of such use may include wing skins on aircraft, and in particular unmanned air vehicles, where devices according to the invention may be used to power structural monitoring equipment, control surfaces, cameras, lights etc. Conveniently, where the device is used to replace a panel on an existing body, vehicle, vessel or craft, the device may preferably be engineered to the same dimensions as the original panel.

Further potential uses on vehicles may include body panels on hybrid or electric drive vehicles where the devices of the invention can be used to save weight and bulk, compared to conventional devices. Such devices may also find use on free flooding hydrodynamic hulls of, say, submersible remotely operated vehicles. The devices would be especially useful on any vehicle where weight or bulk was at a premium like an aircraft or a satellite. On a satellite the saving in space and bulk of devices according to the invention which could be used to power various systems would potentially be of great benefit and would likely increase the payload capability of the satellite substantially.

A further advantage of using structural energy devices according to the invention is that the mass of the replacement panels, where desired, may be distributed integrally throughout the host structure. This can be very beneficial, for example, when sudden shocks occur. Such shocks might occur, for example, for vehicles involved in collisions. Under such conditions the integral nature of the devices will prevent their tending to act as uncontained missiles. Conventional batteries, when used in military tanks or armoured carriers for example, will be liable to act as uncontained missiles during an explosion or under projectile impact.

However, integrated devices according to the invention will not form separate detached objects and will avoid this problem.

The extra weight of additional conventional batteries would normally reduce manoeuvrability and speed of the vehicle whereas batteries according to the invention would have little or no weight or volume penalty. Batteries according to the invention may also comprise external vehicle armour. The distributed nature of the batteries has the advantage of easing the design of an aircraft for the correct weight distribution. There is no parasitic mass which has to be positioned wherever space is available on the aircraft and which forms a concentrated mass which must be balanced in order to trim the aircraft and which must be wired to equipment to be powered and also to a power source. The weight of supports and packaging for the batteries may also be avoided as they will be integral with the aircraft itself. The batteries may be positioned closer to equipment to be powered as they form part of the aircraft structure and do not need separate accommodation. Thus, for example cabin interior lights, particular emergency exit systems and lighting systems may use a standby battery supply from cells comprising cabin panelling in which the lighting is mounted and wing lights or systems equipment may be supplied by power from batteries according to the invention comprising part of the wing structure. Instruments in the cockpit may be powered by batteries, according to the invention, comprising the instrument panel itself, especially to provide backup electronics in the event of a primary powertrain failure.

According to a further aspect of the invention there is provided a method of activating a standby structural composite electrical energy storage device defined herein, including the steps of
causing the valve to open, causing the electrolyte to be transferred from the reservoir to the at least one void.

BRIEF DESCRIPTION OF THE DRAWINGS

Whilst the invention has been described above, it extends to any inventive combination of the features set out above, or in the following description, drawings or claims.

Exemplary embodiments of the device in accordance with the invention will now be described with reference to the accompanying drawings in which:-

FIG. 1 shows a cross sectional side view of a composite energy storage device, with a valve.

FIG. 2 shows a cross sectional side view of an electrochemical cell with an integral valve and reservoir.

DETAILED DESCRIPTION

FIG. 1 shows an example of an electrical energy storage device 1, comprising a first electrode structure 2 which is spaced apart from a second electrode structure 3 by a separator structure 6. The electrodes structures 2, 3 may be connected to suitable electrode contacts 5, 7 respectively to permit electrical charging and discharging of the device.

The electrodes 2, 3 have valves 8, 9 respectively, to allow an electrolyte 4 to be charged from the reservoir 10, into the void 4a within the separator layer 6, in this arrangement a partially bonded separator layer.

FIG. 2 shows an example of a component integral with an alkaline standby battery, depicted generally at 25, comprising an anode structure 12 which is spaced apart from a cathode structure 14 by a separator structure 16, comprising at least one void 23 (ie a cavity) which is to be filled with the electrolyte 24 stored in reservoir layer 21. A chamber 22 with a valve 19 is located between the separator structure 16 through the cathode layer 14, such that electrolyte 24 may be flowed into the void 23 in the separator structure 16, to form an electrochemical cell. The anode and cathode structures 12, 14 may be connected to suitable electrode contacts 18, 20 to permit charging and discharging of the cell in the usual manner, although, as explained in more detail below, the anode and cathode structures 12, 14 may act fully as current collectors.

Each of the anode and cathode structures 12, 14, the separator structure 16 and the reservoir layer 21 are formed as a composite material comprising suitable fibres in a binder matrix 12b, 14b. The anode and cathode structures 12, 14 comprise electrically conductive fibres 12a, 14a in respective binder matrices 12b, and 14b. The separator structure 16 comprises electrically insulating fibres 16a in a binder matrix 16b. The reservoir layer 21 is also composite layer comprising electrically insulating fibres 21a in a binder matrix 21b.

A representative example of a component of the invention integral with an alkaline standby battery in the form of a silver oxide-zinc battery will now be described, in which epoxy resin is used as the binder matrix throughout the device. The anode structure 12 is formed from a plain weave carbon fibre fabric 12a embedded in the binder matrix 12b. The binder matrix 12b also contains porous carbon powder and silver oxide ($Ag_2O$) powder, all of which is mixed thoroughly prior to use. The carbon fibre fabric forms a convenient current collector.

The cathode structure 14 is formed from a plain weave carbon fibre fabric 14a embedded in the binder matrix 14b. The binder matrix 14b also contains porous carbon powder and zinc (Zn) powder, all of which is mixed thoroughly prior to use. The electrochemistry of the silver oxide-zinc battery will be well known to the skilled reader, and therefore further details are not provided herein. The carbon fibre fabric forms a convenient current collector.

The active additives in the anode and cathode structures (the silver oxide, zinc and carbon powder) are typically present as fine powders having particle sizes in the range 1 to 10 µm.

The separator structure 16 is formed from a plain weave E-glass fabric 16a embedded in the binder matrix 16b. Other electrically insulating fibres such as silicon carbide which provide suitable structural reinforcement might be used instead. Other separators such as microporous polymer films may be used in combination with the glass fabric.

The reservoir layer 21 is formed from a plain weave E-glass fabric 21a embedded in the binder matrix 21b. Other electrically insulating fibres such as silicon carbide which provide suitable structural reinforcement might be used instead. The reservoir layer 21 contains an aqueous electrolyte 24 consisting of 30-40% by weight potassium hydroxide in deionised water. The electrolyte is passed in via the chamber 22, when the valve 19 is opened.

The electrolyte 24 can be accommodated in the void 23 in a number of ways. The separator structure 16 may be partially bonded in order to provide void 23, which can be filled by the electrolyte 24. The electrolyte 24 is retained by capillary action between fibres. A 30 to 40% degree of bonding is suitable for this purpose. A porous additive, such as a silica or a silica gel, may be used to provide a more open cell structure (voids 23) or a microporous polymer film (voids 23) may be employed. The valve 19 may, after filling the device, be fitted with a vent system(not shown) to control the release of gases during overcharge conditions. The valve 19 permits the ready introduction and removal of the aqueous electrolyte 24 to create a working cell.

The first and second electrodes, separator and reservoir structures are not necessarily planar. Non-planar configurations may be employed, for example, to provide a curved or even a generally tubular device structure, or to provide devices which can be shaped to any currently existing shaped panel. The structures of the invention are well suited for such configurations.

What is claimed is:

1. A standby structural composite electrical energy storage device which can be used in place of an existing panel or element that forms part of a structural body, the energy storage device comprising:
 a first electrode structure and a second electrode structure each of said first and second electrode structures being formed as a composite material comprising electrically conductive fibres in a respective electrode binder matrix;
 a separator structure, said separator structure being formed as a composite material comprising electrically insulating fibres in a separator binder matrix ;
 a reservoir structure, said reservoir structure being formed as a composite material comprising electrically insulating fibres in a reservoir binder matrix;
 said electrode, separator, and reservoir structures being encapsulated in a composite binder matrix to form an integral, cured fibre polymer composite wherein the separator structure separates the first and second electrode structures respectively;
 at least one electrolyte void between said first and second electrode structures, said electrolyte void being capable of being filled with an electrolyte; and
 at least one reservoir comprising an electrolyte, said reservoir being at least one reservoir void in the reservoir structure, wherein said reservoir is operably linked by a valve to said at least one electrolyte void, such that operation of said valve allows the electrolyte void to be charged with the electrolyte.

2. The device according to claim 1, wherein the device comprises a vent system.

3. The device according to claim 1 wherein the valve is mechanical, chemical, electromechanical or thermal.

4. The device according to claim 1 wherein the valve is a mechanical valve that comprises a Micro Electro-Mechanical Systems ("MEMS") actuator.

5. The device according to claim 1 comprising a liquid or gel electrolyte.

6. The device according to claim 1, wherein the energy storage device is a composite battery or a composite supercapacitor.

7. The device according to claim 1 wherein the first and second electrodes form anode and cathode structures to form a composite battery, and said device further comprises nickel-zinc, nickel-iron, nickel-cadmium, nickel metal hydride, lead acid or silver-zinc, or Li-ion electrochemically active materials.

8. The device according to claim 1, wherein at least one of the first and second electrode and the separator structure contains a porous additive which increases access of the electrolyte when present in said structure.

9. The device according to claim 1, wherein the electrolyte void is a porous material, structural lattice, or a partially bonded separator structure.

10. A method of activating a standby structural composite electrical energy storage device which can be used in place of an existing panel or element that forms part of a structural body, the method comprising:
 providing a device having a first electrode structure and a second electrode structure, each of said first and second electrode structures being formed as a composite material comprising electrically conductive fibres in a respective electrode binder matrix;
 a separator structure, said separator structure being formed as a composite material comprising electrically insulating fibres in a separator binder matrix;
 a reservoir structure, said reservoir structure being formed as a composite material comprising electrically insulating fibres in a reservoir binder matrix;
 said electrode, separator, and reservoir structures being encapsulated in a composite binder matrix to form an integral, cured fibre polymer composite, wherein the separator structure separates the first and second electrode structures respectively;
 at least one electrolyte void between said first and second electrode structures, said electrolyte void being capable of being filled with an electrolyte; and
 at least one reservoir comprising an electrolyte, said reservoir being at least one reservoir void in the reservoir structure, wherein said reservoir is operably linked by a valve to said at least one electrolyte void, such that operation of said valve allows the electrolyte void to be charged with the electrolyte; and
 causing the valve to open, causing the electrolyte to be transferred from the reservoir to the at least one electrolyte void.

11. A panel on a vehicle, vessel, or craft, comprising at least one standby structural composite energy storage device used in place of a panel or element that would otherwise serve as a structural component of the vehicle, vessel, or craft, wherein the composite energy storage device includes:
 a first electrode structure and a second electrode structure, each of said first and second electrode structures being formed as a composite material comprising electrically conductive fibres in a respective electrode binder matrix;
 a separator structure, said separator structure being formed as a composite material comprising electrically insulating fibres in a separator binder matrix;
 a reservoir structure, said reservoir structure being formed as a composite material comprising electrically insulating fibres in a reservoir binder matrix;
 said electrode, separator, and reservoir structures being encapsulated in a composite binder matrix to form an integral, cured fibre polymer composite wherein the separator structure separates the first and second electrode structures respectively;
 at least one electrolyte void between said first and second electrode structures, said electrolyte void being capable of being filled with an electrolyte; and
 at least one reservoir comprising an electrolyte, said reservoir being at least one reservoir void in the reservoir structure, wherein said reservoir is operably linked by a valve to said at least one electrolyte void, such that operation of said valve allows the electrolyte void to be charged with the electrolyte.

* * * * *